Sept. 22, 1970  R. C. BECKWITH  3,530,488
DOCKBOARD
Filed Feb. 11, 1969  2 Sheets-Sheet 2

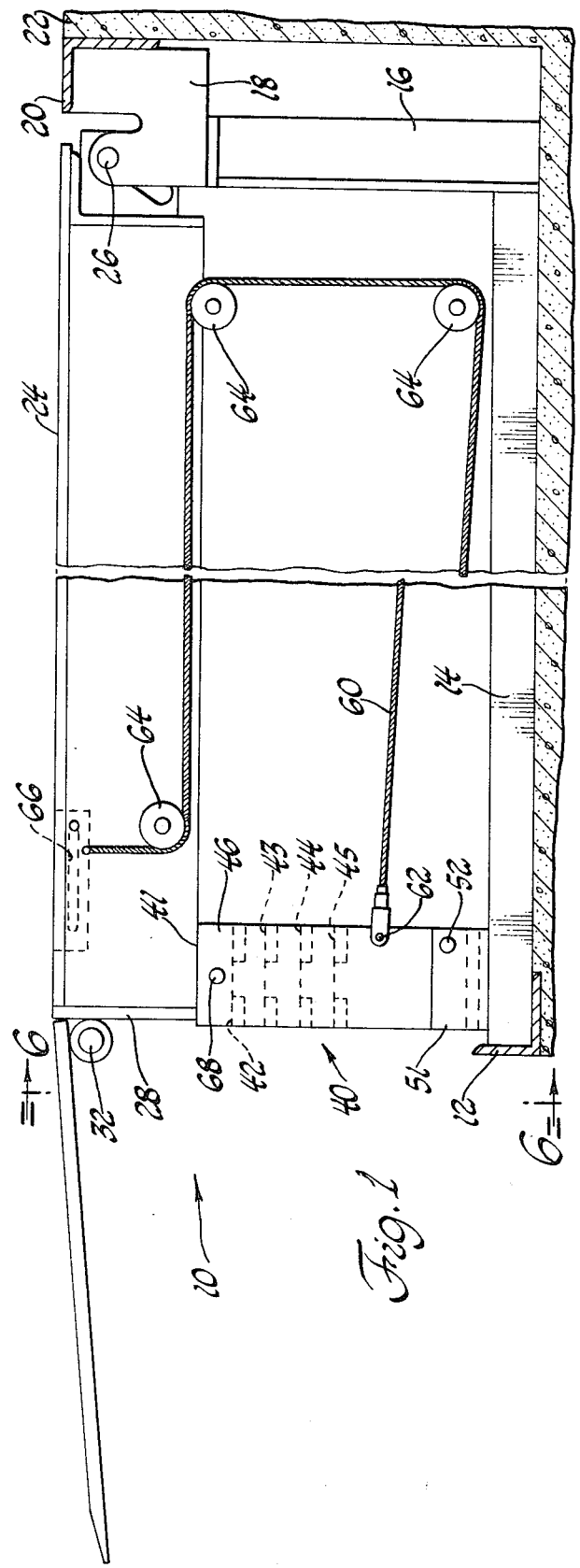

INVENTOR.
Robert C. Beckwith
BY
Barnard, McGlynn & Reising
ATTORNEYS

United States Patent Office 3,530,488
Patented Sept. 22, 1970

3,530,488
DOCKBOARD
Robert C. Beckwith, Milwaukee, Wis., assignor to Loomis Machine Company, Clare, Mich., a corporation of Michigan
Filed Feb. 11, 1969, Ser. No. 798,385
Int. Cl. B65g 11/00
U.S. Cl. 14—71                                    23 Claims

ABSTRACT OF THE DISCLOSURE

A dockboard including a ramp with a lip pivotally connected to the outward end of the ramp and a flange extending downwardly from the ramp. A plurality of plate-like rectangular members are rotatably supported by a shaft and are of different vertical heights and are interconnected by lost motion connections so that upon rotational movement of the longest member, all of the remaining members may be sequentially moved out of the path of movement of the flange on the ramp whereby the ramp may be positioned and the members released so that the member of the appropriate length will be disposed beneath the flange of the ramp to prevent the ramp from moving downwardly any significant amount after a vehicle adjacent the dock, upon which the lip has been disposed, moves away.

---

Dockboard assemblies of the type to which the instant invention pertains include a support means with a ramp pivotally connected to the support means at a rear end with a lip pivotally connected to the front end of the ramp to form an extension thereof and to rest upon the bed of a vehicle adjacent a dock to facilitate the movement of traffic between the dock and the adjacent vehicle. Very frequently these dockboard assemblies are disposed in a pit in a concrete dock with the rear or pivoted end of the ramp adjacent the upper surface of the dock. In one such dockboard assembly, means are provided for urging the ramp to pivot upwardly, such means taking the form of springs or torsion bars. A holddown mechanism is employed to prevent the ramp from pivoting upwardly in response to the biasing of springs or torque bars. There is also included linkage or an appropriate mechanism for moving the lip between a pendent position and an extended cantilevered position where the lip forms an extension of the ramp.

In using such a dockboard assembly, a truck, railroad car, or similar vehicle, to be loaded or unloaded, is positioned adjacent the dock and the holddown mechanism is released so that the ramp pivots upwardly and the lip is moved to the extended position. The ramp is then pivoted downwardly as by an operator walking onto the ramp so that the lip rests upon the adjacent vehicle, such as the bed of a truck, to facilitate the movement of traffic between the dock and the adjacent vehicle. The ramp is prevented from pivoting downwardly as traffic moves thereacross due to the fact that the lip is resting upon the bed of a truck. However, when the vehicle or truck moves away from the dock, the ramp is free to move downwardly in response to a weight disposed thereupon. In other words, should a vehicle move away from the dock to discontinue the support of the lip, an operator may walk upon the ramp or drive a forklift or similar vehicle upon the ramp and the ramp would pivot downwardly until it engages the bottom of the pit. This situation, of course, is hazardous and can result in serious injury to dockworkers. This is particularly clear in a situation where the ramp is generally horizontal or flush with the adjacent dock when the lip is supported on an adjacent vehicle so that when the vehicle moves away from the dock a dockworker may assume that the ramp is supported in a cross traffic position flush with the top of the dock by the lip engaging the bottom of the pit, but where, in fact, the ramp is slightly below the upper level of the dock and not supported by the lip so that upon movement of traffic along the dock and across the ramp, the ramp pivots downwardly causing an accident. A solution to this problem is set forth in U.S. Pat. 3,137,-017 which discloses such a dockboard assembly including legs having notches therein attached to the ramp for engaging abutments at the bottom of the pit so that when the ramp is no longer supported by the lip resting upon an adjacent vehicle the notches engage the abutments to prevent downward pivotal movement of the ramp an amount which would be dangerous.

It is an object and feature of this invention to provide an alternative safety means for preventing the ramp from pivoting downwardly when the lip is no longer supported by an adjacent vehicle and which includes a plurality of abutment surfaces, each of which is horizontally and vertically spaced from adjacent abutment surfaces to define a plurality of steps and which are movable to position the appropriate abutment surface for preventing the ramp from pivoting downwardly.

Other objects and attendant advantages of the present invention will be readily appreciated as the same becomes better understood by reference to the following detailed description when considered in connection with the accompanying drawings wherein:

FIG. 1 is a fragmentary side view of a preferred embodiment of the dockboard of the instant assembly with the ramp supported in the dock level position;

FIG. 2 is a fragmentary view similar to FIG. 1 but showing the ramp supported at a different position;

FIG. 3 is a fragmentary view similar to FIGS. 1 and 2 but showing the ramp supported at yet another position;

Referring now to the drawings wherein like numerals indicate like or corresponding parts throughout the several views, a dockboard assembly constructed in accordance with the instant invention is generally shown at 10 in FIG. 1.

Figure 4:
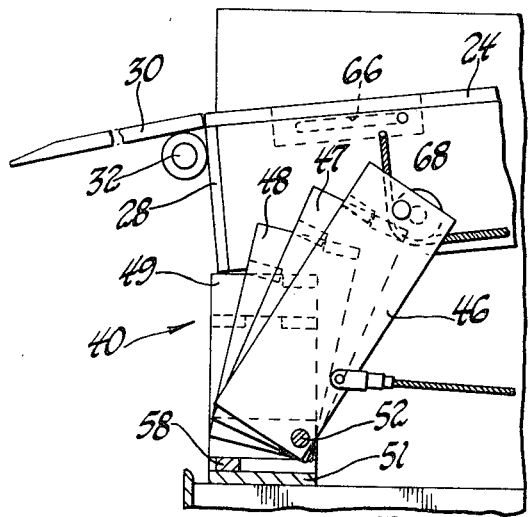
FIG. 4 is a view similar to FIGS. 1 through 3 showing the ramp supported at still another position.

The dockboard assembly 10 includes a support means comprising the structural members 12, 14, 16, 18 and 20 which are secured to a dock 22 and in a pit formed in the dock 22.

The assembly 10 also includes a ramp 24 which is pivotally connected at 26 to the structural member 18 of the support means for pivotal movement between raised and lowered positions to provide for the movement of traffic between the dock 22 and an adjacent vehicle (not shown). The ramp 24 includes a downwardly extending flange 28 at the front or forward end thereof. There is also included a lip 30 pivotally connected through a piano-type hinge 32 to the front end of the ramp 24 for movement between a pendent position (not shown) where the lip is substantially perpendicular to the ramp 24 and an extended position to form an extension of the ramp as illustrated.

Many devices known in the prior art may be included for biasing the ramp to pivot upwardly and to pivot the lip from the pendent position to the extended position illustrated. Because numerous assemblies for accomplishing these functions are known in the prior art, it is not necessary to illustrate such mechanisms here and, accordingly, means have not been shown for biasing the ramp to pivot upwardly or for pivoting the lip to the extended position. However, one such means which may be utilized with the instant invention is shown in U.S. Pat. 3,249,956.

The dockboard assembly 10 also includes movable safety means generally indicated at 40 for preventing the ramp 24 from pivoting downward below various selectable predetermined positions which are respectively illustrated in FIGS. 1 through 5. The safety means 40 includes a series of more than two (2) abutment surfaces 41 through 45, respectively, at least parts of which are laterally or horizontally offset from one another and are vertically spaced from one another so that upon movement of the safety means 40, one of the abutment surfaces will be positioned to prevent the ramp from pivoting downward below a predetermined position. More specifically, safety means 40 includes a plurality of members 46 through 50, each of which defines one of the abutment surfaces 41 through 45. Each of said members 46 through 50 respectively are plate-like and rectangular in configuration. The members 46 through 50 are each of a different length and the first member 46 is the longest. The abutment surfaces 41 through 45 are respectively at the upper ends of the respective members 46 through 50 and selectively engage the flange 28 of the ramp 24. There is also included means comprising the brackets 51 and shafts 52 for movably supporting the rectangular members 46 through 50 to allow the abutment surfaces 41 through 45 to move generally horizontally at least in part. That is, the shafts 52 extend through the lower rear corners of the rectangular members 46 through 50, respectively, and as the members 46 through 50 are pivoted or rotated about the axis of the shaft 52, by which they are supported, the abutment surfaces 41 through 45 move in an arc and, therefore, at least have a component of movement which is horizontal. The shaft 52 is supported by the structural members 14 of the support means through the brackets 51 which are in turn secured to the structural members 14 as by welding. The members 46 through 50 are movable relative to one another and are disposed in a series and in side by side relationship. There is included lost motion means comprising the projections 53 and 54 interconnecting the members for moving each member upon a predetermined amount of movement of the adjacent member. More specifically, the lost motion means includes a plurality of lateral projections 53 and 54 extending from the members 46 through 50 respectively. Projections 53 and 54 extend from adjacent members and are in overlapping relationship and are spaced in a generally horizontal plane when the members are in the generally vertical position illustrated in FIGS. 1 and 7. Thus, each member may be rotated a predetermined amount before the projection 53 thereof engages the projection 54 of the adjacent member to effect rotation of the adjacent member.

The safety means 40 also includes biasing means comprising the springs 56 for urging the members 46 through 49 to rotate to a generally vertical position. Each of the springs 56 reacts between the shaft 52 and one of the members in that each spring is coiled around the shaft and has one end inserted into a hole in a member and the other end inserted into a hole in the shaft 52. In the particular embodiment illustrated, the last or smallest member 50 does not have a spring biasing it toward the vertical position because the member 50 establishes the lowest position to which the ramp 24 may be pivoted and is, therefore, not rotatable as its bottom engages the bracket 51. It will be appreciated, however, that a spring 56 may be associated with the last member 50 and the last member 50 allowed to rotate out of the path of movement of the flange 28 of the ramp 24. There is also included stop means comprising the ridge 58 for limiting forward rotation of the members 46 through 49 to the generally vertical position in response to the springs 56.

The assembly also includes control means for moving the safety means to position one of the abutment surfaces 41 through 45 respectively for supporting the ramp 24. The control means includes a cable 60 attached at 62 to one of the first members 46 and extends about the pulleys 64 to the other end which is secured to a handle 66 which is manually graspable from above the ramp for pulling the cable 60. As alluded to, there are two sets of members 46 through 50 which are spaced from one another so that like members of each set engages the flange 28. The control means includes means comprising the rod 68 for interconnecting the first members 46 of each set for moving the first member 46 of the second set in response to movement of the first member 46 of the first set, the first member of the first set being the member 46 to which the cable 60 is attached.

Figure 5:
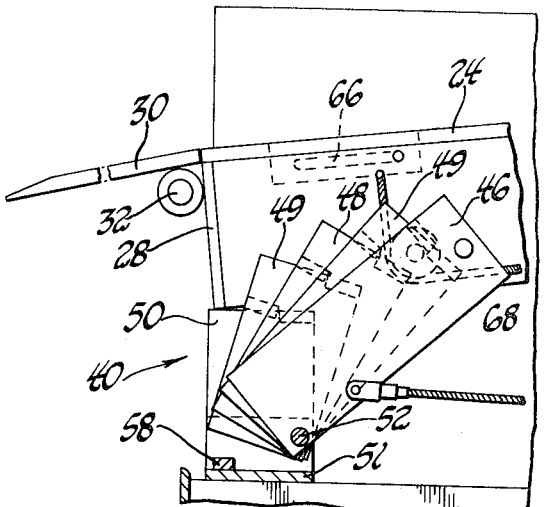
FIG. 5 is a view similar to FIGS. 1 through 4 but showing the ramp supported at yet another position.
Figure 6:
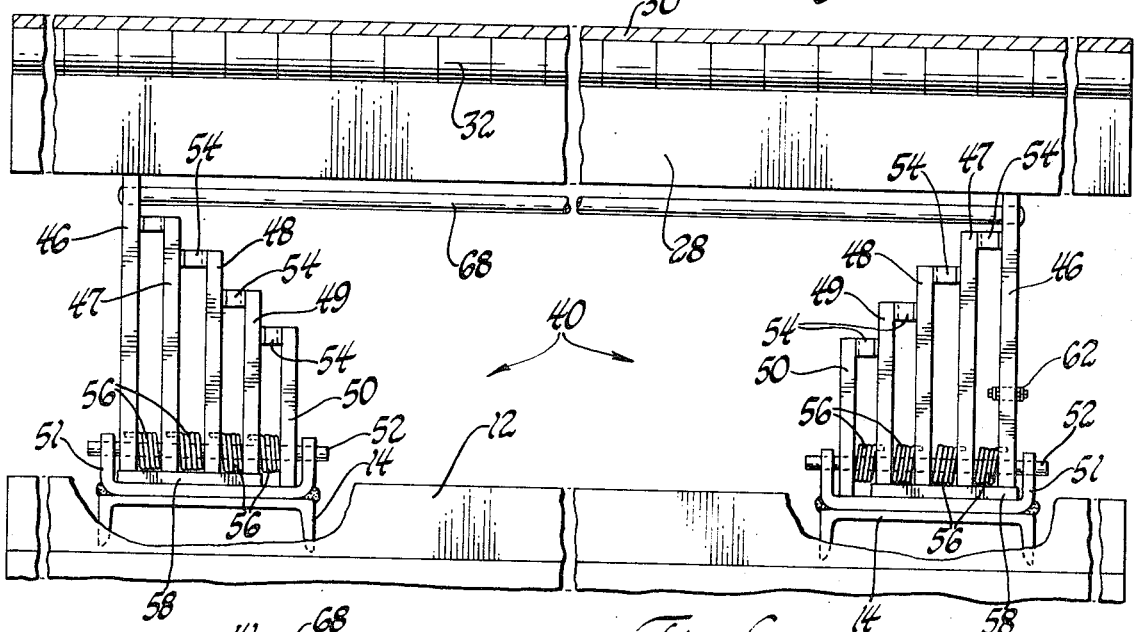
FIG. 6 is a cross sectional view taken substantially along line 6—6 of FIG. 1.
Figure 7:
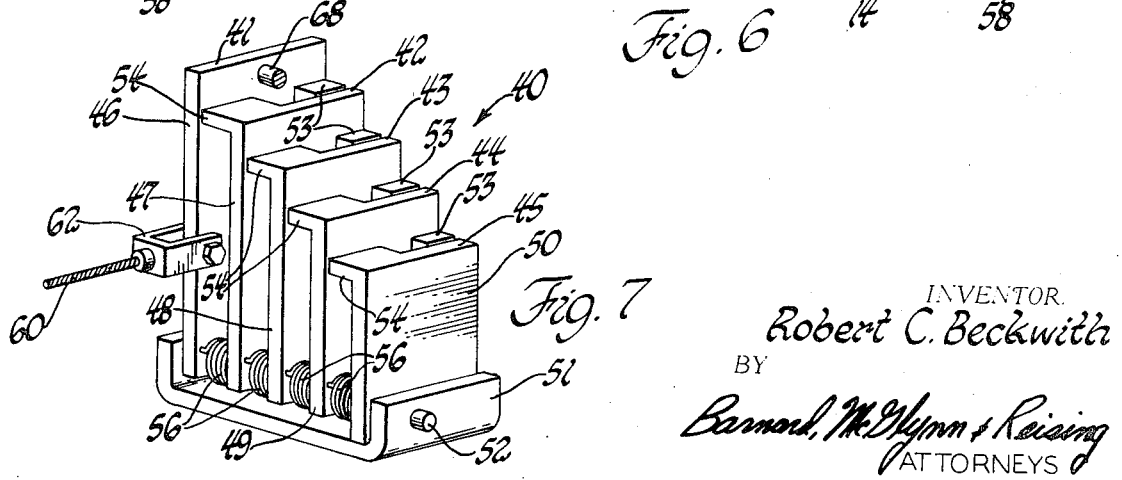
FIG. 7 is a perspective view of the preferred embodiment of the safety means of the instant invention.

In operation of the assembly, the ramp 24 is pivoted upwardly as the lip 30 is pivoted upwardly to the extended position and thereafter the ramp and lip are lowered so that the lip 30 rests upon an adjacent vehicle. As the ramp and lip 30 are lowered, the manually graspable handle 66 is pulled to pull the cable 60 which in turn rotates the first rectangular members 46 about the axis of the shaft 52. The members 46 rotate in unison because of their interconnection through the rod 68. When the first members 46 have rotated a predetermined amount the lateral projection 53 thereof will engage the lateral projection 54 of the second members 47 to begin pivoting or rotating the second members 47. As the first members 46 are rotated further, the successive members 48 and 49 will be rotated as illustrated in FIGS. 4 and 5. When the ramp 24 is lowered so as to rest the lip 30 upon an adjacent vehicle the manually graspable handle 66 is released whereupon the springs 56 return the members toward the vertical position and depending upon the position of the ramp, certain of the members will be retained from returning to the vertical position by engaging the flange 28. The other shorter members which are free to pass beneath the flange 28 will return to the vertical position. The flange 28 may not be resting upon an abutment as provided by the upper ends of one of the members but in the event the vehicle moves away from the dock, the ramp 24 will pivot downwardly only a small amount until it engages the abutment at the top of the longest member disposed in the vertical position therebeneath. As the ramp 24 is raised, the flange 28 will move out of the way of the remaining members to allow the remaining members to move to the generally vertical position as illustrated in FIGS. 1 and 7 where the dockboard 24 may be supported in the dock level position by the flange 28 engaging the abutments 41 at the upper ends of the first members 46 as illustrated in FIGS. 1 and 6.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dockboard assembly comprising; support means, a ramp pivotally connected to said support means for pivotal movement between raised and lowered positions to provide for the movement of traffic between a dock and an adjacent vehicle, movable safety means for preventing said ramp from pivoting downward below various selectable predetermined positions, said safety means including a series of more than two abutment surfaces at least parts of which are laterally offset from one another and are vertically spaced from one another so that upon movement of said safety means one of said abutment surfaces will be positioned to prevent said ramp from pivoting downward below a predetermined position.

2. An assembly as set forth in claim 1 including control means for moving said safety means to position one of said abutment surfaces for supporting said ramp.

3. An assembly as set forth in claim 1 including manually operable control means for moving said safety means to position one of said abutment surfaces for supporting said ramp.

4. An assembly as set forth in claim 2 including means supporting said safety means for allowing said abutment surfaces to move generally horizontally at least in part.

5. An assembly as set forth in claim 4 wherein said safety means includes a plurality of members each of which defines one of said abutment surfaces.

6. An assembly as set forth in claim 5 wherein said members are movable relative to one another.

7. An assembly as set forth in claim 6 wherein said members are disposed in a series and in side by side relationship and including lost motion means interconnecting said members for moving each member upon a predetermined amount of movement of the adjacent member.

8. An assembly as set forth in claim 7 wherein said control means is connected to a first of said members.

9. An assembly as set forth in claim 8 wherein said members are each a different length and said first member is the longest.

10. An assembly as set forth in claim 9 wherein said means supporting said safety means comprises a shaft attached to said support means and rotatably supporting said members.

11. An assembly as set forth in claim 10 including biasing means for urging said members to rotate to a generally vertical position.

12. An assembly as set forth in claim 11 wherein said abutment surfaces are disposed at the upper ends of the respective members and selectively engage said ramp.

13. An assembly as set forth in claim 12 wherein said lost motion means includes a plurality of lateral projections extending from said members with projections extending from adjacent members being in overlapping relationship and spaced in a generally horizontal plane when said members are in said generally vertical position whereby each member may be rotated a predetermined amount before the projection thereof engages the projection of the adjacent member to effect rotation of the adjacent member.

14. An assembly as set forth in claim 13 wherein said ramp includes a downwardly extending flange which engages said abutment surfaces and including two sets of said members spaced from one another so that like members of each set engages said flange.

15. An assembly as set forth in claim 14 wherein said control means is attached only to the first member of the first set of members and including means interconnecting the first members of each set for moving the first member of the second set in response to movement of said first member of the first set.

16. An assembly as set forth in claim 15 wherein said means interconnecting said first members comprises a rod.

17. An assembly as set forth in claim 16 wherein said control means includes a cable extending to a manually graspable handle supported by said ramp.

18. An assembly as set forth in claim 17 including stop means for limiting rotation of said members in response to said biasing means to said generally vertical position.

19. An assembly as set forth in claim 18 wherein said members are generally plate-like and rectangular in configuration with said shaft extending therethrough in the lower rear corners thereof.

20. An assembly as set forth in claim 19 wherein said biasing means includes a plurality of springs each of which reacts between said shaft and one of said members.

21. An assembly as set forth in claim 13 including a lip pivotally connected to said ramp for movement between a pendent position and an extended position to form an extension of said ramp.

22. A dockboard assembly comprising; support means, a ramp pivotally connected to said support means for pivotal movement between raised and lowered positions to provide for the movement of traffic between a dock and an adjacent vehicle, safety means for preventing said ramp from pivoting downward below various selectable predetermined positions, said ramp including a downwardly extending flange at the outward end thereof for engaging said safety means, said safety means including a plurality of abutment surfaces which are vertically and horizontally spaced from one another to define a plurality of steps, means movably supporting said safety means for allowing the latter to move said abutment surfaces out of the flange engaging position, and biasing means for urging said safety means to move said abutment surfaces to said flange engaging position so that said abutment surfaces may be moved out of the flange engaging position as said ramp is positioned and released so that the appropriate abutment surface will be moved into position by said biasing means to engage said flange as the higher abutment surfaces will be prevented from returning to the flange engaging position by engagement of at least a portion of the safety means with said flange.

23. A dockboard assembly comprising; support means, a ramp pivotally connected to said support means for pivotal movement between raised and lowered positions to provide for the movement of traffic between a dock and an adjacent vehicle, movable safety means for preventing said ramp from pivoting downward below selectable predetermined positions, said safety means including a plurality of members of different lengths with each member presenting an abutment surface vertically spaced from the abutment surface of any other member, said members being movably supported by said support means so that a selected one of said members may be positioned to prevent said ramp from pivoting downward below a selected position.

References Cited

UNITED STATES PATENTS

| | | | |
|---|---|---|---|
| 2,974,336 | 3/1961 | Kelley | 14—71 |
| 3,117,332 | 1/1964 | Kelley | 14—71 |
| 3,203,002 | 8/1965 | McGuire | 14—71 |
| 3,299,456 | 1/1967 | Dieter | 14—71 |
| 3,368,229 | 2/1968 | Pfleger | 14—71 |

NILE C. BYERS, Jr., Primary Examiner